United States Patent

Sanzenbacher et al.

[11] Patent Number: 6,065,496
[45] Date of Patent: May 23, 2000

[54] ELECTROMAGNETICALLY OPERATED DIRECTIONAL VALVE

[75] Inventors: Hermann Sanzenbacher, Schwieberdingen; Peter Kroll, Gemmrigheim; Volkmar Leutner, Friolzheim; Joachim Zumbraegel, Eberdingen, all of Germany

[73] Assignee: Robert Bosch GmbH, Stuttgart, Germany

[21] Appl. No.: 09/043,041

[22] PCT Filed: Feb. 13, 1997

[86] PCT No.: PCT/DE97/00277

§ 371 Date: Mar. 15, 1999

§ 102(e) Date: Mar. 15, 1999

[87] PCT Pub. No.: WO97/32137

PCT Pub. Date: Sep. 4, 1997

[30] Foreign Application Priority Data

Mar. 1, 1996 [DE] Germany .............. 196 07 773

[51] Int. Cl.[7] .............. F15B 13/044; F16K 31/06
[52] U.S. Cl. ................. 137/625.65; 251/129.1
[58] Field of Search .............. 137/625.65; 251/129.1

[56] References Cited

FOREIGN PATENT DOCUMENTS

| 2 109 770 | 9/1972 | Germany . |
|---|---|---|
| 29 43 714 A1 | 5/1981 | Germany . |

*Primary Examiner*—Gerald A. Michalsky
*Attorney, Agent, or Firm*—Michael J. Striker

[57] ABSTRACT

An electromagnetically actuated directional control valve is proposed, whose control slide (18) can be switched against a restoring spring system (45) into three switching positions (39, 41, 42) by a double-lift magnet (12). The spring system (45) has a strong spring (31) and a counter-acting weak spring (37), which are disposed on both sides of the control slide (18). With a pushing magnet (12), the control slide (18) is solely deflected against the weak spring (37), which is supported on it over the entire lift area. With a pulling magnet (12), a spring plate (32), which centers the center position (39), is pulled way from the control slide (18), which now is displaced by the weak spring (37), against the force of the strong spring (31). The tappet (29), connected with the armature, and the control slide (18) are separate independent components, which only form a frictionally connected operative connection.

11 Claims, 2 Drawing Sheets

FIG. 2
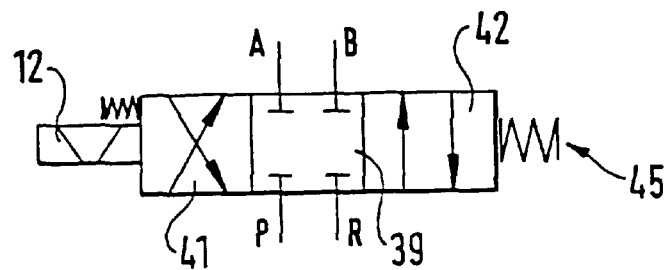
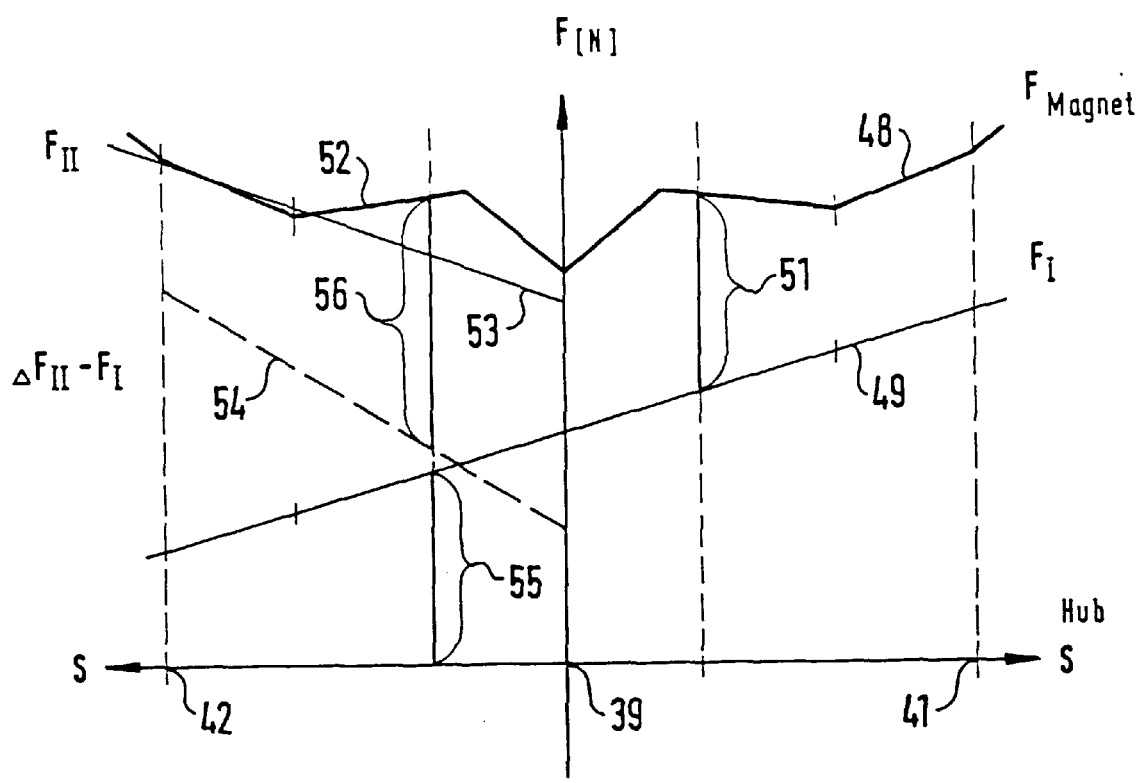
FIG. 3

ELECTROMAGNETICALLY OPERATED DIRECTIONAL VALVE

BACKGROUND OF THE INVENTION

The invention relates to an electromagnetically actuated directional control valve.

Such an electromagnetically actuated, hydraulic directional control valve is already known from DE-OS 2 109 770, which is designed as a compact 4-directional-3-position-valve, wherein the actual valve elements are integrated into the magnet housing. This 3/4-directional valve operates with a double-lift magnet, whose armature is attached by way of a cross pin to a tappet connected in one piece to a hollow control slide, which is movable in the longitudinal direction. In the center position the control slide is centered by means of a restoring device with two counter-acting springs, which are tied at both sides of the armature to the tappet and are braced at the housing by means of two individual spring plates. Although the double-lift magnet has some advantages, the control slide of this directional valve is centered purely frictionally connected by means of the counter-acting springs of equal strength, so that the center position is not sufficiently fixed because of the lack of a stop. In many cases such frictionally connected centering is insufficient and leads to an unfavorable construction, particularly since the synchronization of the position of the control edges with the magnet actuation also presents difficulties. Furthermore, the directional valve as proposed requires a special type of construction for the control slide with the tappet, so that standard structural elements cannot be used. In case of an exchange of the spring on the inside, the actual valve has to be disassembled.

Furthermore, an electromagnetically actuated hydraulic 4/3-directional valve is known from DE 29 43 714 A1, whose control slide is centered in a center position by two frontally arranged springs constituting a restoring spring system. Two singly acting solenoids, which are attached to the two opposing front faces of the housing, form an electromagnetic actuating device, by means of which the control slide can be deflected into two working positions on both sides of its center position. This directional control valve which requires two solenoids in order to achieve three positions is constructed comparatively long. In addition, it requires two electrical connecting leads and two plugs, because of which it is relatively expensive to construct and the costs are higher then with a double-lift magnet. In some cases the required space is not available for a directional control valve with two solenoids, so that the application possibilities are limited.

SUMMARY OF THE INVENTION

The electromagnetically actuated directional control valve in accordance with the invention two springs embodied with different strength and their support is embodied in such a way that during the deflection of the control slide from its central position into its one working position, the double lift magnet only works against the force of the weak spring, while during deflection from the center position into the other working position, it works against the differential force against the two counter-acting springs.

The electromagnetically actuated directional control valve has the advantage, that by using the special properties of the double-lift magnet it allows a simple construction, wherein a reliable and exactly defined embodiment of the center position can be achieved. Because of the use of the double-lift magnet, the structural length of the directional control valve becomes considerably shorter compared to the use of two plain solenoids, making it possible to omit a second electrical connecting lead as well as a second plug and thus allowing for a more cost-effective construction of the directional control valve. The directional control valve is distinguished by the simple interior construction, in particular of its movable components, therefore allowing a simple and thus cost-effective assembly. The double-lift magnet and the hydraulic directional control valve can be easily synchronized with each other, wherein individual building components are easily adjustable. By using standard building components, the directional control valve can largely be realized in a cost-effective manner.

By way of the other measure, further advantageous embodiments and improvements of the directional control valve are possible. Of particular advantage is the embodiment in which tappet and control slide are embodied as two separate components. In this embodiment an interlocking connection between tappet and control slide can be omitted, so that the use of a simply constructed tappet and a standard control slide is possible, which allows a particularly simple and advantageous assembly of the pressure pipe and the control slide. Thus, a standard embodiment of a conventional 4/3-directional control valve can be used. Furthermore, with the proposed directional control valve the switching capacity can be optimized by means of a proper embodiment of the characteristic spring curves and synchronization with the characteristic magnetic curves. In addition, the directional control valve is particular suitable for the attachment of a manual emergency actuator. Additional advantageous embodiments ensue from the remaining claims, the description and the drawings.

BRIEF DESCRIPTION OF THE DRAWINGS

An exemplary embodiment of the invention is represented in the drawings and will be described in more detail in the following description. Shown are in FIG. 1 a longitudinal section of an electromagnetically actuated directional control valve in a simplified representation, in FIG. 2 a block diagram of the directional control valve in accordance with FIG. 1, and in FIG. 3 a characteristic curve field for the double-lift magnet and the restoring spring system of the directional control valve in accordance with FIG. 1.

DESCRIPTION OF THE PREFERRED EMBODIMENT

Figure 1:
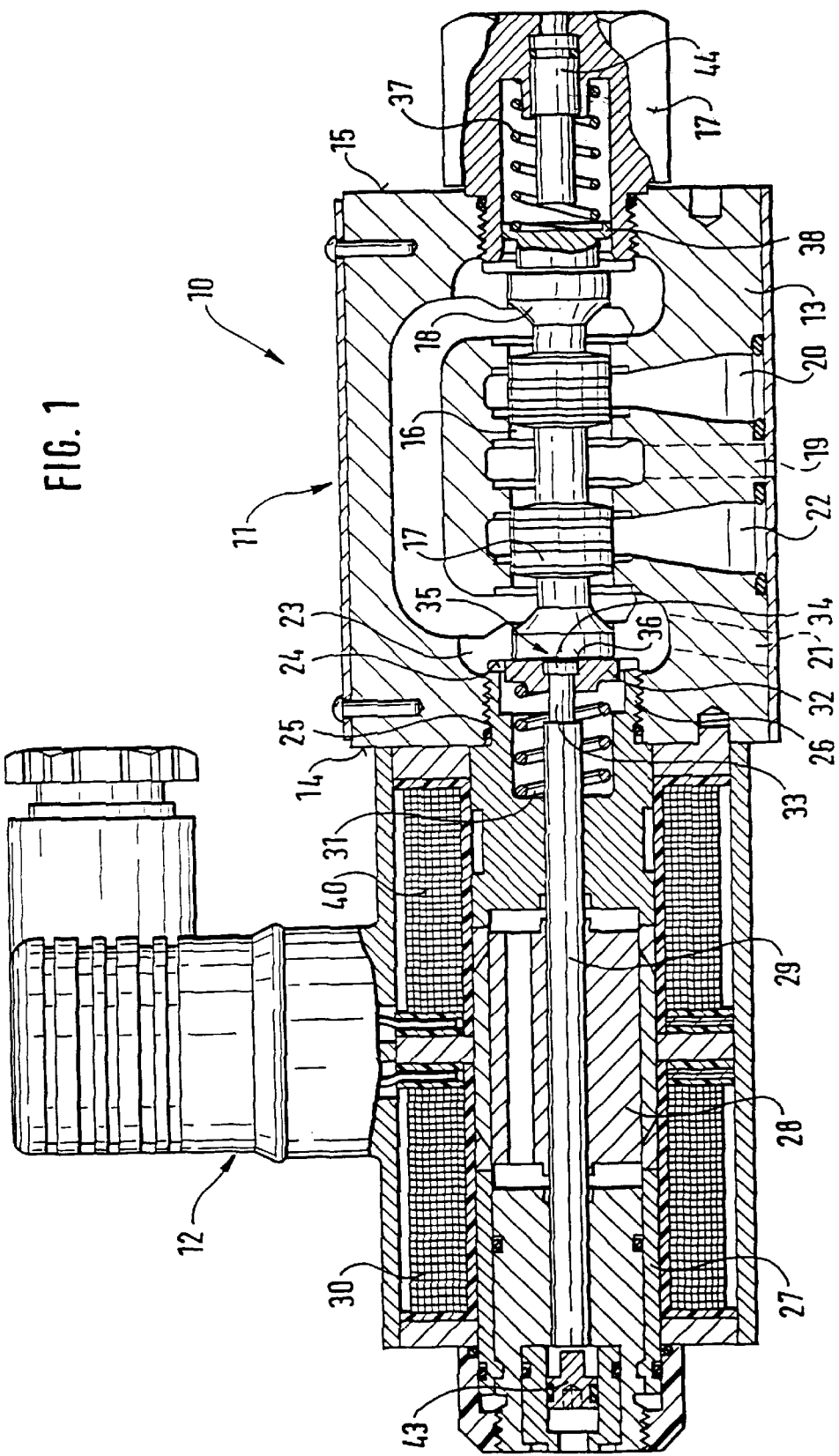

FIG. 1 shows a longitudinal section of an electromagnetically actuated directional control valve 10, which essentially is comprised of a customary 4/3-valve 11 and an attached double-lift magnet 12.

The directional control valve 10 has a housing 13 with a double-lift magnet 12 attached to its front face 14, while at the opposite, second front face 15 a slider bore 16 penetrating the housing 13 is closed by a sealing cap 17. A control slide 18 is guided in a sealed and sliding manner in the slider bore 16, which controls the pressure medium connection between an intake 19 and a return 21 as well as two user outlets 22 and 20.

In the area of a left return chamber 23, the slider bore 16 is expanded via a shoulder 14 firmly attached to the housing into a threaded bore 25 open toward the front face 14, into which the double-lift magnet 12 is screwed by means of a sleeve-shaped threaded extension 26 into its pressure pipe 27. An armature 28, whose longitudinal movements are transferred to the control slide 18 via a tappet 29, is received in the interior of the pressure pipe 27. The first and second coil 30, 40 of the double-lift magnet 12 are disposed on the exterior of the pressure pipe 27.

A first, strong spring 31, whose one end is supported on the pressure pipe 27, is received in the interior of the pressure pipe 27 in the area of its open end at the sleeve-shaped thread extension 26. With its other end, this spring 31 lies against a spring plate 32, which in turn is supported on the shoulder 24 firmly attached to the housing. At the one end, the spring plate 32 is slidingly guided on a neck section 33 of the tappet 29 in an area with a reduced diameter, while a collar 34 of the tappet 29 adjoining the neck section 33 forms an interlocking connection 35 with the spring plate 32. The spring plate 32 resting on the shoulder 24 firmly attached to the housing simultaneously forms a stop 36 for the control slide 18, which is pressed against this stop 36 by the second spring 37 arranged in the sealing cap 17. In comparison with the first spring 31, the second spring 37 is embodied significantly weaker and is supported on one side in the sealing cap 17, and on the other side directly on the control slide 18 via a second spring plate 38. When the weaker second spring 37 presses the control slide 18 against the stop 36, while the stronger, first spring 31 maintains the spring plate 32 on the shoulder 24 firmly attached to the housing, the tappet 29 then is exactly fixed in axial direction by means of its collar 34, so that the armature 28 also takes up the center position 39 represented. With a pressure pipe 27 screwed into the housing 13, the first spring plate 32 thus serves as stop 36 for the centering of the control slide 18. The weak spring 37 with the associated spring plate 38 is arranged and supported in the sealing cap 17 in such a way, that during the entire lift of the control slide 18 it acts on the control slide 18 between its two working positions 41 and 42, i.e. on both sides of the center position 39.

A manual emergency actuator 43 is attached on the outer free end of the double-lift magnet 12, by means of which the tappet 29 can be operated in case of failure of the double-lift magnet 12. A manual emergency actuator 43 is also provided inside the sealing cap 17, by means of which the control slide 18 can be actuated in an emergency in case of failure of the magnet.

FIG. 2 is a simplified representation of a block diagram of the directional control valve 10 in accordance with FIG. 1. The control slide is centered in the center position 39 represented by means of a restoring spring system 45, of which the two springs 31 and 37 are a part. It can be deflected from this center position 39 toward both sides into working positions 41, 42, wherein the double-lift magnet 12 alternatively excites one of the coils 30, or respectively 40, and in this way deflects the control slide 18 by means of the armature 28 against the restoring forces of the spring system 45.

The operation of the electromagnetically actuated directional control valve 10 will be described as follows, wherein simultaneously reference is made to FIG. 3, in which the characteristic curves of the magnet and the characteristic spring curves have been drawn in order to make a representation of the balance of forces of the electromagnetic drive possible.

In a non-excited double-lift magnet 12, the control slide 18 is centered in the center position 39 represented by means of the restoring spring system 45. In this case the strong spring 31 positioned on the magnet side presses the spring plate 32 against the shoulder 24 firmly attached to the housing, while at the same time the weaker spring 37 presses the control slide 18 against the spring plate 32 serving as stop 36. The spring plate 32 thus serves for centering the position of the control slide 18. The weak spring 37 here acts directly on the control slide 18. By means of the control slide 18 resting against the spring plate 32, the tappet 29 is axially fixed with its collar 34 in the spring plate 32, so that the armature 28 also takes up its initial position in the center position 39.

For deflection of the control slide 18 from its center position 39 into a working position 41, the coil 40 is excited in the double-lift magnet 12, so that via the armature 28 and the tappet 29 the pushing magnet moves the control slide 18 to the right into its working position against the force of the weak spring 37. The balance of power in this switching process of the control slide 18 can be seen in FIG. 3, wherein the force progression is represented over the lift by means of the first characteristic curve 48 of the magnet. The characteristic spring curve for the weak spring 37 is identified as 49 and is designed in such a way, that a sufficient excess force remains for opening the control slide 18. In opening the control edge of the control slide 18, this excess force 51 can be see in the area between the characteristic curve 48 of the magnet and the characteristic curve 49 of the spring. As clearly shown in FIG. 3, the characteristic curve 49 of the spring of the weak spring 37 extends past the center position 39 to the other working position 42, since the spring 37 is effective across the entire lift of the control slide 18. When the coil 40 is turned off, the control slide 18 is pushed back from its working position 41 into the center position 39 by the weak spring 37. During this switching process the first spring plate 32 remains resting against the shoulder 24 without encumbering the movement of the tappet 29.

If the control slide 18 is deflected into the opposite direction, the coil 30 in the double-lift magnet 12 is excited, so that the now pulling magnet lifts the first spring plate 32 via the armature 28 and the tappet 29 against the force of the stronger spring 31 from the shoulder 24. This switching movement, directed to the left in FIG. 1, of the control slide 18 is supported by the force of the weak spring 37, which acts past the center position 39 directly on the control slide 18. In this case the spring plate 32 is pulled along by the tappet 29 because of the interlocking connection 35. In this switching movement the force balance is shown in FIG. 3 as follows: The flow of the force of the magnet is shown by the characteristic curve 52 of the magnet which extends symmetrically with the first characteristic curve 48 of the magnet. For the strong spring 31, its flow of force over the lift is represented by the second characteristic curve 53 of the spring. This second characteristic curve 53 of the spring only extends between the center position 39 and the second working position 42. The forces in accordance with the second characteristic curve 53 of the spring and the first characteristic curve 49 of the spring, working counter to each other, lead to a differential force in the area between the center position 39 and the second working position 42, the flow of which is shown by the characteristic curve 54 of the differential force in FIG. 3. The magnet 12, which operates in a pulling mode, must work against this differential force 54. From this, an excess force 56 results in the area of the control edge opening 55, by which the control slide 18 is moved to the left in FIG. 1. Although here this excess force 56 is slightly stronger than the excess force 51 during the oppositely directed deflection of the control slide 18, it is, however, of an order of magnitude which is comparable with the latter. The excess force is laid out sufficiently large over the lift of the control slide 18, so that the directional control valve 10 has excellent switching properties and the respective flowing forces and friction forces can be dependably overcome.

As FIG. 3 shows in addition, that an optimal switching performance in the directional control valve 10 can easily be achieved by choosing appropriate characteristic curves of the spring and/or characteristic curves of the magnet. The characteristic curves of the magnet 48 and 52, symmetrically drawn in FIG. 3, do not have to be retained in that case. The partially asymmetrical characteristic curves of the spring force that result from the prestressed springs can be compensated by appropriately modifying the characteristic curves of the magnet. This means, that the characteristic curves of the magnet are designed asymmetrically. This can be simply achieved, in that in the double-lift magnet 12 the properties of the magnet are varied by means of a different geometry of the pole shapes or different amounts of Ampere windings of the magnet coils 30 or 40. Springs and magnets in that case can be changed separately or together, so that a multitude of combinations are possible.

If after reaching the second working position 42 the excited coil 30 is turned off, the control slide 18 is shifted into the center position 39 shown in FIG. 1 by the differential force 54 from the strong spring 31 and the oppositely acting weak spring 37, and is centered there. A restriction of the working positions 41 and 42 can be simply achieved, in that the armature 28 in the pressure pipe 27 respectively strikes the associated yoke parts of the double lift magnet 12.

Changes of the shown embodiment are of course possible without deviating from the scope of the invention. For example, the strong spring and the weak spring can be disposed exchangeably in the manner of a kinematic reversal wherein, however, the armature must have an interlocking connection with the control slide in order to make a pulling motion possible. The construction shown in FIG. 1, in which the strong spring is disposed between the magnet and the valve, represents, however, a particularly advantageous combination, which permits a separate construction of the tappet and the slide, since a simple frictionally connected connection is sufficient.

What is claimed is:

1. An electromagnetically actuated directional control valve with a control slide disposed in a housing, which is centered in a center position by means of a restoring spring system and by means of a double-lift magnet which works in two directions and can be deflected by a double-lift magnet operating in two directions into working positions which are located on each side of the center position, wherein an armature is assigned to the two coils of the double-lift magnet, which is operatively connected with the control slide via a tappet, and wherein the spring system has two springs, which act counter to each other and are supported by means of spring plates, characterized in that the two counter-acting springs (31, 37) are embodied with different strengths and arranged relative to the control slide (18), relative to the double lift magnet and relative to each other so, that during the deflection of the control slide (18) from its center position (39) into its one working position (41), the weak spring (37) acts on the control slide (18) and the double lift magnet only works against the force of the weak spring (37), while during deflection from the center position (39) into the other working position (42) both springs act on the control slide (18) and the double lift magnet works against the differential force (54) of the two counter-acting springs (31, 37).

2. The directional control valve in accordance with claim 1, characterized in that the tappet (29) is separately embodied from the control slide (18) and has a frictionally connected operative connection with it.

3. The directional control valve in accordance with claim 1, characterized in that the weak spring (37) is supported between a component (17) firmly attached to the housing and the control slide (18) in such a way, that it is effective over the entire lift of the control slide (18) between the two working positions (41, 42).

4. The directional control valve in accordance with claim 1, characterized in that the strong spring (31) is supported on one side against a component (27) firmly attached to the housing, and on another side via the spring plate (32) against the housing (13), wherein the spring plate forms a stop (36) for the control slide (18) in its center position (39), and that a spring plate (32) is connected in an interlocking manner with the tappet (33) during its movement against the strong spring (31).

5. The directional control valve in accordance with claim 1, characterized in that the springs (31, 37) are disposed on opposite sides of the longitudinally movable control slide (18).

6. The directional control valve in accordance with claim 1, characterized in that the strong spring (31) is disposed between the double-lift magnet (12) and the control slide (18).

7. The directional control valve in accordance with claim 6, characterized in that the strong spring (31) is disposed in a pressure pipe (27) of the double-lift magnet (12), and the weak spring (37) is disposed in sealing cap (17) affixed to the housing (13).

8. The directional control valve in accordance with claim 1, characterized in that in the center position (39) of the control slide (18), the tappet (29) rests frictionally connected with its free end (34) against the end of the control slide (18) and at the same time is connected in an interlocking manner with a spring plate (32).

9. The directional control valve in accordance with claim 1, characterized in that it is embodied as 4/3-valve with five work chambers in the housing (13), of which an externally located return chamber (23) has a shoulder (24) firmly attached to the housing serving as stop for a spring plate (32).

10. The directional control valve in accordance with claim 1, characterized in that the characteristic force curves (48, 52) of the double-lift magnet (12) are essentially embodied symmetrically toward each other from the center position (39), and that during the opening of the control edges of the control slide (18), the excess forces (51, 56) in both directions are essentially of the same order of magnitude.

11. The directional control valve in accordance with claim 1, characterized in that a manual emergency actuator (43, 44) is disposed at the double-lift magnet (12), and at a sealing cap (17).

* * * * *